United States Patent [19]
Eichfeld

[11] Patent Number: 4,869,195
[45] Date of Patent: Sep. 26, 1989

[54] FISHING POLE MOUNTING DEVICE FOR A BOAT

[76] Inventor: Timothy J. Eichfeld, Disstim Corp., 217 South Hurffville Rd., Deptford, N.J. 08096

[21] Appl. No.: 214,519

[22] Filed: Jul. 1, 1988

[51] Int. Cl.⁴ ............................................. A01K 97/10
[52] U.S. Cl. ...................................... 114/364; 114/255; 43/21.2; 43/42.74; 248/512; 248/513
[58] Field of Search ................. 114/255, 364; 43/21.2, 43/27.4, 42.74; 248/512, 513, 520, 534

[56] References Cited

U.S. PATENT DOCUMENTS

| | | | |
|---|---|---|---|
| 2,852,218 | 9/1958 | Stires | 248/513 |
| 2,854,147 | 9/1958 | Derr | 248/513 |
| 3,291,427 | 12/1966 | Hutchings | 248/513 |
| 4,056,220 | 11/1977 | Trimble | 114/364 |
| 4,157,803 | 6/1979 | Mack | 248/512 |
| 4,388,774 | 6/1983 | Thoemke | 114/255 |
| 4,425,729 | 1/1984 | Miyamae | 43/21.2 |
| 4,527,349 | 7/1985 | Emory | 248/513 |

Primary Examiner—Sherman D. Basinger
Assistant Examiner—Thomas J. Brahan
Attorney, Agent, or Firm—Norman E. Lehrer

[57] ABSTRACT

A pair of aligned elongate members for extension transversely across and mounting on a boat, a connection between the inner ends of the elongate members, locating pins on the elongate members for engagement in the rod holders of a boat, and fishing pole receivers on the elongate members and connector, for trolling bait and lures behind a boat.

6 Claims, 2 Drawing Sheets

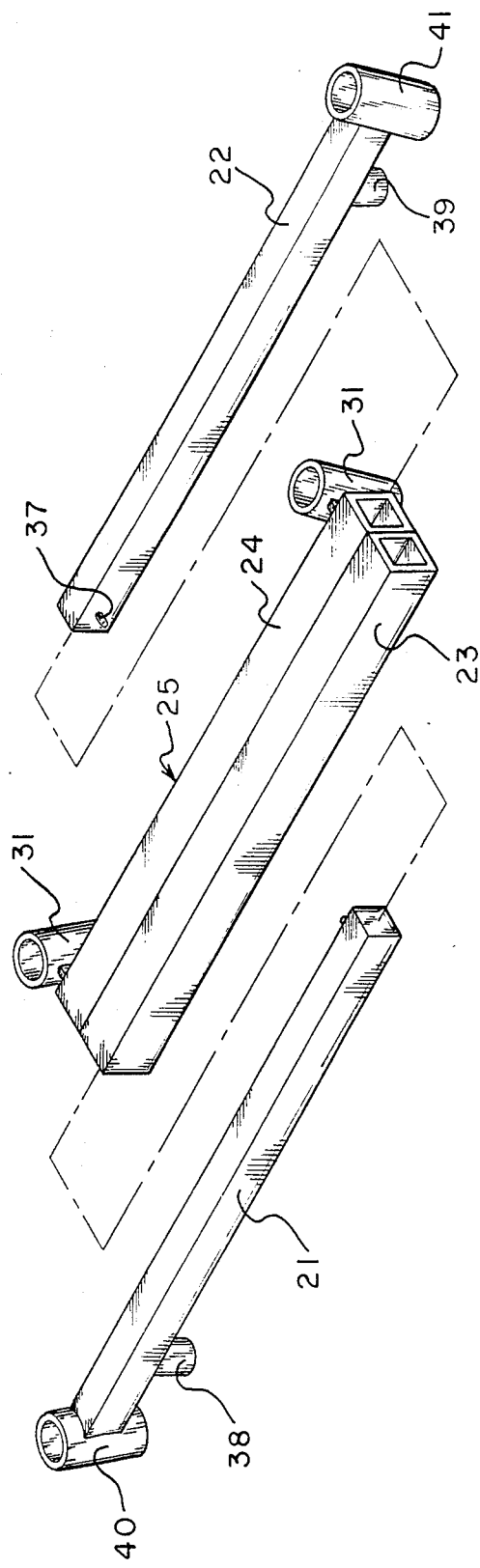
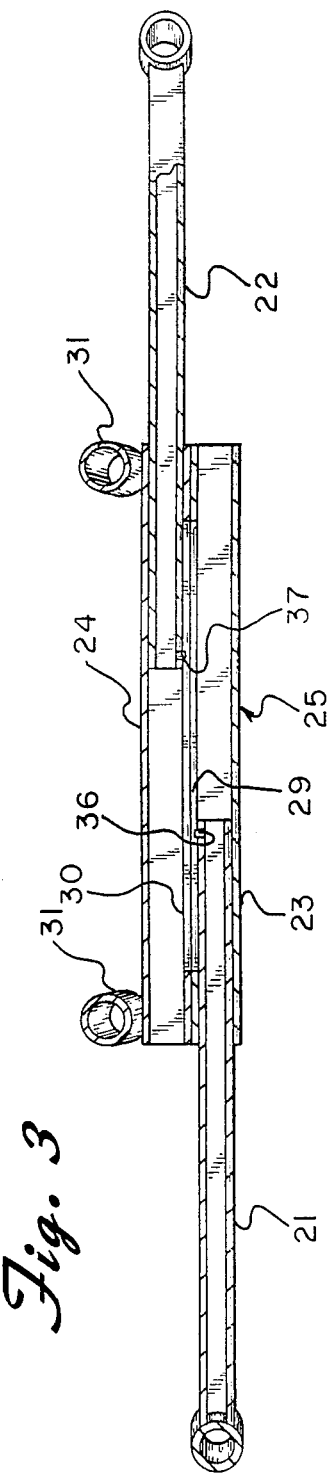

FISHING POLE MOUNTING DEVICE FOR A BOAT

BACKGROUND OF THE INVENTION

While it has been customary to troll fishing lines behind a moving boat by outriggers employing large masts and heavy equipment, this is only satisfactory for large fishing boats. Of course, from time immemorial, fishing lines have been trolled behind moving boats, both with fishing rods and without fishing rods. However, this limited the number of lines that could be trolled without interference or tangling between the lines.

Applicant is aware of the below listed prior patents:

| NAME | PAT. NO. | DATE |
| --- | --- | --- |
| RIGGS | 1,812,756 | June 30, 1931 |
| LUTTRUP | 2,230,511 | Feb. 4, 1941 |
| APPLETON ET AL. | 2,917,263 | Dec. 15, 1959 |
| SEAGER | 4,071,219 | Jan. 31, 1978 |
| MACK | 4,157,803 | Jun. 12, 1979 |
| HAWIE | 4,485,579 | Dec. 4, 1984 |
| EMORY, JR. | 4,527,349 | July 9, 1985 |

The prior art fails to suggest a structure of the simplicity of Applicant's structure, wherein the pole mounting device may be very quickly set and very quickly withdrawn, without the need for tedious fastening and unfastening, as required by the prior art.

SUMMARY OF THE INVENTION

Accordingly, it is an important object of the present invention to provide a fishing pole mounting device for a boat, which mounts on a boat in a staunch and sturdy manner without the need for screws and similar fasteners, being quickly positionable on the boat by merely dropping in locator pins, and which may readily afford about four pole holders substantially spread apart to avoid tangling of lines.

It is a further object of the present invention to provide a fishing pole mounting device having the advantageous characteristics mentioned above, wherein there may be provided a pair of pole holders mounted outboard of respective sides of the boat, and having an inclination to further spread apart the rod lines.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is an exploded perspective view showing the pole mounting apparatus.

FIG. 3 is a horizontal sectional view taken generally along the line 3—3 of FIG. 1.

DESCRIPTION OF THE PREFERRED EMBODIMENT

Figure 1:
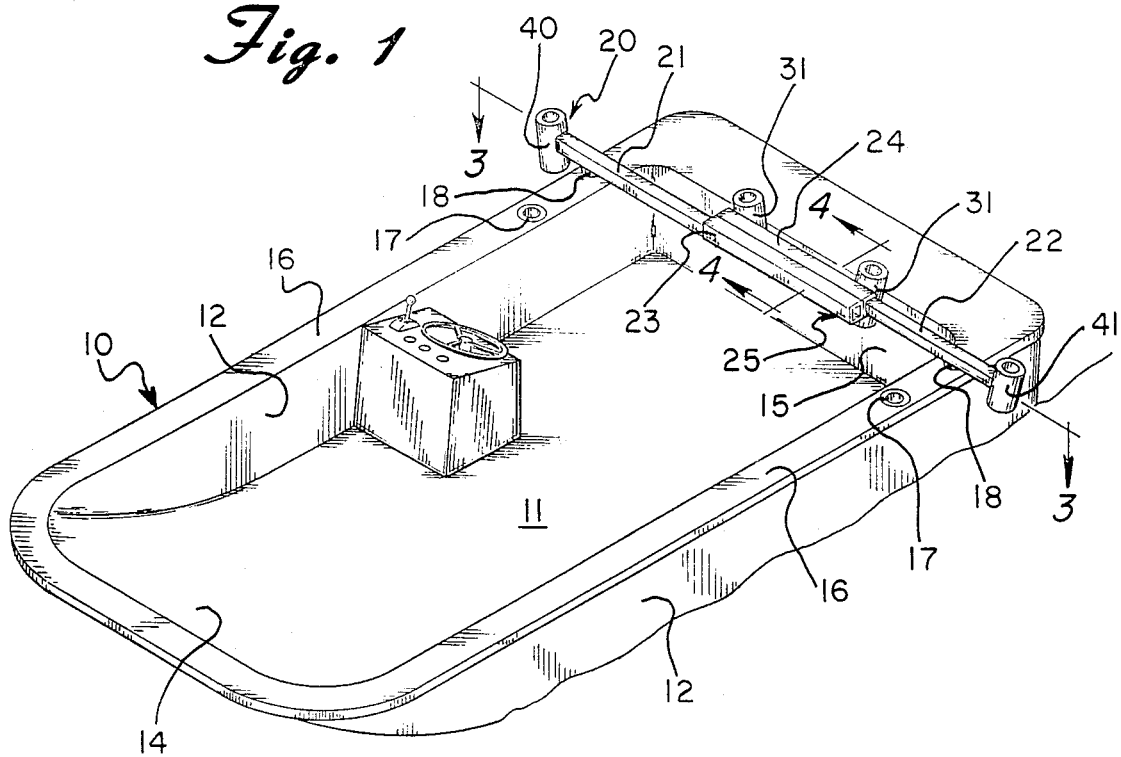
FIG. 1 is a top perspective view showing a fishing pole mounting device of the present invention in association with a small boat.

Referring now more particularly to the drawings, and specifically to FIG. 1 thereof, a boat is there generally designated 10 and may include a bottom 11, on opposite sides of which upstand side walls 12. A forward wall or bow 14 extends laterally across the front end of the bottom wall 11 and between the side walls 12. A stern or transom defines a rear wall, as at 15, and extends laterally between the rear ends of the side walls 12.

Covering the upper extremities of the side walls 12 are gunwales 16. The gunwales 16 may be provided with sockets or fishing pole holders, as at 17 and 18. The rod holders or sockets 17 and 18 are suitably fixed in the gunwales 16 for removably receiving the butt end of a fishing rod. Fishing rods trolled in rod holders 17 and 18 of the same gunwale are very likely to interfere with each other, so that only one rod holder 17, 18 on each gunwale is, in practice, usable at a time.

However, applicant has provided a fishing pole or rod mounting device, generally designated 20, for use on the boat 10 in a quick and simple manner to substantially immediately increase the number of rod holders simultaneously usable from two to six.

The rod holding device 20 may include a pair of generally aligned elongated members or tubes 21 and 22 extending transversely of the boat 10 and having their inner ends adjustably connected together by a pair of tubes 23 and 24 suitably secured together in adjacent parallelism.

That is, the connecting tubes 23 and 24 are longitudinally coextensive in parallelism with each other and define a connector 25 for the elongate members or tubes 21 and 22.

More specifically, the tubes 23 and 24 may advantageously be of non-circular configuration, say rectangular and fixedly secured together, as by we welds 26, in a coplanar longitudinally coextensive relationship.

Figure 4:
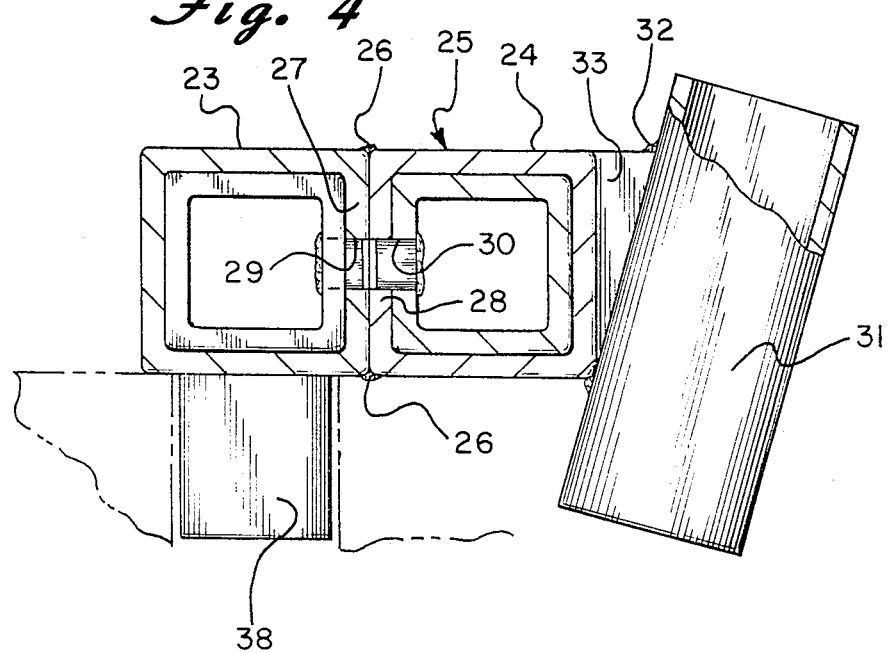
FIG. 4 is an enlarged transverse sectional view taken generally along the line 4—4 of FIG. 1.

The tubes 23 and 24 of the connector 25 may have their facing, adjacent side walls 27 and 28 provided with longitudinally extending elongate slots, as at 29 and 30, best seen in FIGS. 3 and 4.

Adjacent to the ends of the connector 25, or otherwise fixed to the connector 25, may be one or more relatively short lengths of tube or pipe, as at 31. More specifically, a short length of pipe 31 may be fixed, as by welding 32 and a gusset or bracket 33 to one of the tubes 23, 24, say the latter as shown in the drawing. While two pipe lengths 31 are shown fixed to opposite ends of the connector 25, there may be more or less such pipe lengths, as desired.

The elongate members or tubes 21 and 22 each extend slidably into one tube 23 and 24, preferably being non-circular for conforming engagement in the connector tubes.

The elongate members 21 and 22 have guide members or pins 36 and 37 respectively slidably engaging in slots 30 and 29 of connector tubes 24 and 23, as best seen in FIG. 3.

Thus, the extensile members of arms 22 are non-rotatable with respect to their connector tubes 23 and 24, and are retained in assembly with the latter by pins 36 and 37 in slots 29 and 30.

The extensile elongate members or arms 21 and 22 are substantially aligned, except for the offset of the tubes 23 and 24.

Depending from the underside of each elongate member or arm 21 and 22 is a locating pin or peg, as at 38 and 39, see FIG. 2.

The locating pins or pegs 38 and 39 are movable toward and away from each other by extension and retraction of the arms 21 and 22, so as to space the pegs for downward engagement in respective rod holders 18, to firmly mount the assembly 20 in position on the boat.

At opposite distal ends of the elongate members or arms 21 and 22 are secured respective short length of pipe or tube 40 and 41 providing additional rod holders outboard of the gunwales 16.

In use, it is apparent that, with the rod holding device 20 mounted on the boat as illustrated and described, it is only necessary to insert one or more fishing rods into the rod holders 17, 31, 40 and 41.

The rods may be removed by mere upward withdrawal from the rod holders; and, the rod mounting device may be removed by mere upward withdrawl of the pegs 38 and 39 from the rod holders or receivers 18. If desired, the holding device may be contracted to a minimum length by sliding the tubes 21 and 22 toward each other into the connector 25.

Although the present invention has been described in some detail by way of illustration and example for purposes of clarity of understanding, it is understood that certain changes and modifications may be made within the spirit of the invention.

I claim:

1. A fishing pole mounting device for a boat, said device comprising a pair of elongate members for extension transversely across and mounting on the boat, adjustable connecting means comprising a pair of parallel tubes attached side by side to telescopically receive the inner ends of said elongate members, locating the means on said elongate members for interfitting relation with the boat, and tubular pole receivers carried by said mounting device, at least two of said tubular pole receivers being mounted on said elongate members outboard of the adjacent locating means.

2. A fishing pole mounting device according to claim 1, said locating means comprising pins depending from said elongate members for engagement in rod holders carried by the boat gunwale.

3. A fishing pole mounting device according to claim 1, said elongate members being of non-circular cross-sectional configuration, and said connection means being non-circular for non-rotative interfitting engagement with said elongate members.

4. A fishing pole mounting device according to claim 1, at least one of said pole receivers being carried by said connection means.

5. A fishing pole mounting device according to claim 4, said locating means comprising pins depending from said elongate members for engagement in rod holders carried by the boat gunwales.

6. A fishing pole mounting device according to claim 5, said elongate members being of non-circular cross-sectional configuration, and said connection means being non-circular for non-rotative interfitting engagement with said elongate members.

* * * * *